US006560172B1

(12) United States Patent
Nakajo (10) Patent No.: US 6,560,172 B1
(45) Date of Patent: May 6, 2003

(54) OPTICAL DISC RECORDING METHOD AND APPARATUS

(75) Inventor: Yukihisa Nakajo, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 301 days.

(21) Appl. No.: 09/684,146

(22) Filed: Oct. 5, 2000

(30) Foreign Application Priority Data

Oct. 6, 1999 (JP) .......................................... 11-285820

(51) Int. Cl.[7] ................................................ G11B 7/00
(52) U.S. Cl. ............................... 369/44.13; 369/44.34; 369/47.48; 369/53.34
(58) Field of Search ........................... 369/44.11, 44.13, 369/44.26, 47.38, 47.36, 53.38, 47.48, 44.34, 53.34

(56) References Cited

U.S. PATENT DOCUMENTS 5,859,820 A * 1/1999 Nagasawa et al. ....... 369/44.26

* cited by examiner

Primary Examiner—Nabil Hindi
(74) Attorney, Agent, or Firm—Pillsbury Winthrop LLP (57) ABSTRACT

In an optical disc recording method conducted by irradiating an optical beam for recording onto an optical disc to form pits on the lands thereof, when a recording speed is lower than a predetermined recording speed, the sampling/holding operation of a light receiving signal for detecting a wobble signal is performed during a power-off period of a recording signal. On the other hand, when the recording speed is higher than the predetermined recording speed, the sampling/holding operation is performed during a power-on period of the recording signal. Therefore, a wobble signal can be detected at all times at good C/N ratio independently of the speed recording.

4 Claims, 5 Drawing Sheets

OPTICAL DISC RECORDING METHOD AND APPARATUS

BACKGROUND OF THE INVENTION

1. Field of the Invention

The present invention relates to an optical disc recording method and apparatus for recording, by optical power, information on an optical disc, such as CD-R, CD-RW, CD-WO, MD and DVD. More particularly, the present invention relates to detection of a wobble signal at the time of recording.

The present application is based on Japanese Patent Application No. Hei. 11-285820, which is incorporated herein by reference.

2. Description of the Related Art

The write-once optical disc, e.g., CD-R (i.e., Compact Disc-Recordable) disc and a rewritable optical disc, e.g., CD-RW (i.e., Compact Disc-ReWritable) disc have guide grooves, so called as grooves or pre-grooves, which are formed in advance in a recording layer thereof. By irradiating a laser beam onto and along a groove or a track formed with a land which is defined between the adjacent grooves formed in an optical disc which has been rotated, information is recorded on the track in a form of strings of pits. Absolute time in pre-groove information (i.e., ATIP information) is buried in the groove of the optical disc of this type by wobbling the track groove. Ordinarily, the recording/reproducing operation is controlled, based on a tracking servo and the ATIP information, which is obtained by reproducing the wobble signal.

Figure 5:
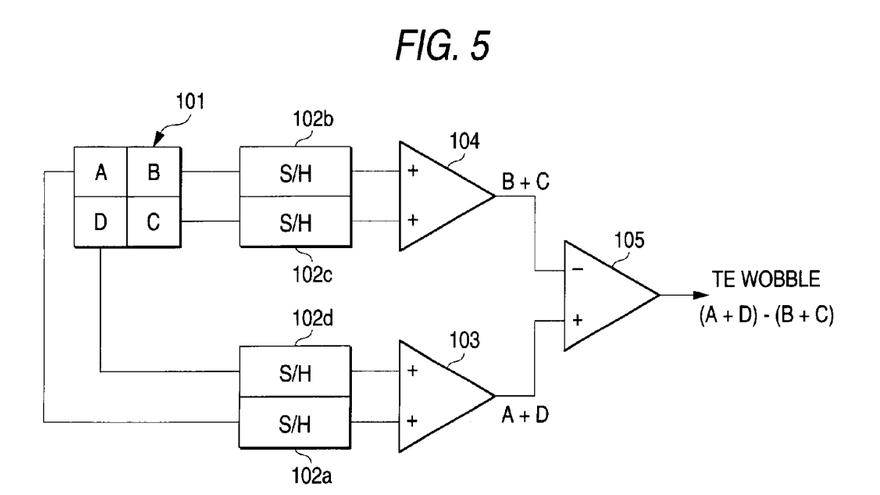
FIG. 5 is a block diagram showing a related circuit for detecting a TE signal and a wobble signal.

As shown in FIG. 5, a tracking error signal (TE signal) and a wobble signal are detected by processing an output signal of a position-detecting photo detector of an optical pickup, which is ordinarily a four-segment photo detector 101. The four-segment photo detector 101 has an imaginary plane having four light-receiving segmental areas A, B, C and D. According to those light receiving areas, the areas (A+D) and (B+C) form a light receiving surface divided in the radial direction of the optical disc, and the areas (A+B) and (C+D) form a light receiving surface divided in the track direction of the optical disc. The light receiving areas A, B, C and D produce signals when those areas receive optical beams reflected from the optical disc. Those output signals are respectively sampled and held by sample/hold circuits 102a, 102b, 102c and 102d. The signals, which have been derived from the light receiving areas A and D, and sampled and held by the sample/hold circuits 102a and 102d, are added together by an adder 103. The signals, which have been derived from the light receiving areas B and C, and sampled and held by the sample/hold circuits 102b and 102c, are added together by an adder 104. A difference between the output signals of the adders 103 and 104, i.e., ((A+D)−(B+C)), is computed by a subtractor 105. EFM signals are modulated by presence or absence of pit detected in phase at the light receiving surfaces A, B, C and D. The signals derived from the light receiving areas (A+D) and (B+C) have inverse phases with respect to a position as viewed in the radial direction of the beam spot on the land. Accordingly, those signals can be utilized as TE signals or the wobble detecting signals.

Figure 6:
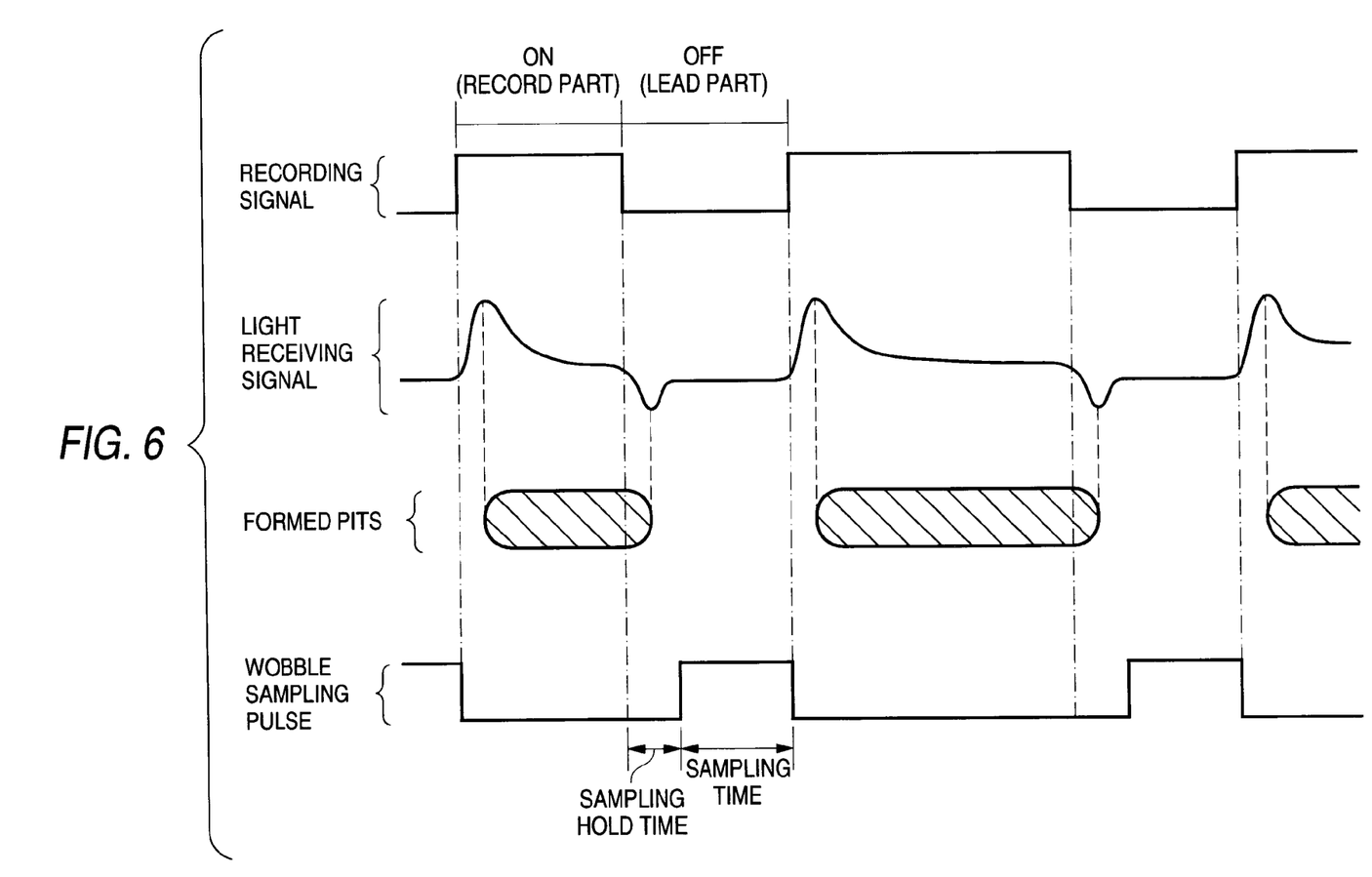
FIG. 6 is a diagram showing waveforms of signals when information is recorded at the speed of four times relative to the standard speed by using a conventional technique, and showing configurations of formed pits in plan view.

FIG. 6 is a graph showing a relationship among a recording signal, a light receiving signal, pits formed, and a wobble-signal detecting sampling pulse signal when information is recorded at a speed of four times relative to the standard audio CD speed (hereinafter, referred simply as a standard speed). As shown in FIG. 6, a waveform of the recording signal has a "recording part" when its power is in an on state, and a "lead part" when its power is in an off state. A level of the light receiving signal varies in accordance with a reflectivity variation during a recording pit forming process, to thereby have a waveform pattern as follows. The signal level of the light receiving signal reaches its peak immediately after the recording signal is put in a power-on state. Then, the signal level gradually descends with formation of a pit. When the recording signal is put in a power-off state, its level variation is settled down at a fixed level for a part of the period, to thereby form a flat waveform pattern. That is, the pit formation begins at an instant that the light receiving signal level reaches the peak value, and ends some time after the recording signal is put in a power-off state. A wobble sampling pulse signal is held for a fixed period of time after the recording signal is put in a power-off state. The reason why it is held for the fixed time is that if the wobble detection sampling is performed during a period where the light receiving signal is stable in level variation, the carrier to noise (C/N) ratio of the wobble signal is good.

In the wobble detecting method and apparatus described above, when information is recorded at a speed, which is higher than the above-described speed, and which is, for example, twelve times relative to the standard speed, the waveform pattern of the light receiving signal greatly varies, and the stable period during the power-off period of the recording signal is extremely short. The first reason is that in the case of the high speed recording, in order to secure a reliable pit formation, a recording time must be increased with increase of the recording speed. For example, provided that the recording time is nT when the recording speed is eight times relative to the standard speed, a recording time at the speed of twelve times is (n+0.4)T. Further, the second reason is that in the high speed recording, the recording power is larger than that in the lower speed recording, and therefore, the light receiving signal is more dull in waveshape. Accordingly, in the case of the high speed recording, the sampling time period for the wobble detection is extremely short, so that the C/N of the wobble signal is degraded.

SUMMARY OF THE INVENTION

It is therefore an object of the present invention to provide an optical disc recording method and apparatus which can detect a wobble signal at all times at good C/N ratio independently of the speed recording.

According to the first aspect of the present invention, there is provided an optical disc recording method including the steps of:

irradiating an optical beam for information recording onto an optical disc, based on a recording signal;

forming at least one pit having predetermined length on a land disposed on the optical disc;

obtaining a light receiving signal by causing a light receiving element, having a light receiving surface segmented in a radial direction of the optical disc, to receive light reflected from a pit forming part and a non-pit forming part, both of which are formed on the optical disc at the time of information recording;

sampling and holding the light receiving signal derived from the light receiving element; and detecting a tracking servo and a wobble signal on the basis of balance of the sampled and held light receiving signal as viewed in the radial direction of the optical disc;

wherein when a recording speed is lower than a predetermined recording speed, the sampling and holding step is performed to detect the wobble signal during a power-off period of the recording signal, and wherein when the recording speed is higher than the predetermined recording speed, the sampling and holding step is performed during a power-on period of the recording signal.

According to the second aspect of the present invention, there is provided an optical disc recording apparatus which includes:

an optical pickup emitting an optical beam to record a pit onto a land of an optical disc, based on a recording signal, the optical pickup including a light receiving element which has a light receiving surface segmented in a radial direction of the optical disc, and which receives light reflected from the optical disc, the optical pickup producing a light receiving signal associated with each segmental area of the light receiving surface;

a sampling pulse generating circuit processing the recording signal to generate a first sampling pulse signal, the sampling pulse generating circuit retarding the recording signal to generate a second sampling pulse signal which is put in an on-state of the recording signal when the recording speed is lower than a predetermined speed, and which is put in an off-state of the recording signal when the recording speed is higher than the predetermined speed;

a first sample/hold circuit which samples and holds the light receiving signal derived from the optical pickup based on the first sampling pulse;

a tracking error detecting circuit which generates a tracking error signal based on balance of the light receiving signal sampled and held by the first sample/hold circuit as viewed in the radial direction of the optical disc;

a servo circuit which performs a tracking control of the optical pickup on the basis of the tracking error signal from the tracking error detecting circuit;

a second sample/hold circuit which samples and holds the light receiving signal output from the optical pickup based on the second sampling pulse; and a wobble detecting circuit which detects a wobble signal based on balance of the light receiving signal sampled and held by the second sample/hold circuit as viewed in the radial direction of the optical disc.

When an optical beam is irradiated onto an optical disc having a dye layer (i.e., when a recording signal is in a power-on state), a reflecting light signal (i.e., light receiving signal) from the optical disc is ordinarily high in level immediately after the irradiation since a pit is not formed on the optical disc and hence its reflectivity is high. As the pit formation progresses at a time constant, the reflectivity gradually decreases. Accordingly, the light receiving signal likewise decreases in level. When the optical beam is not irradiated (i.e., when the recording signal is in a power-off state), a time period appears where the light receiving signal is stable, viz., a curve representing a variation of its signal level is substantially flat. This phenomenon occurs when the recording speed is lower than a predetermined recording speed. For this reason, in the present invention, when information is recorded at a recording speed, which is lower than a predetermined recording speed, the sampling operation for detecting a wobble signal is performed during a period where the light receiving signal is stable in level variation within a power-off period of the recording signal. With increase of the recording speed to a high speed of, for example, ten times as high as the standard speed, it is required to increase a ratio of the power-on period to the power-off period of the recording signal in order to reliably form pits. Additionally, the light receiving signal is dull in waveshape at the leading and trailing regions (i.e., its output level descending is gentle and its bottom peak appears with a delay). As a result, the period where the light receiving signal is stable in level variation within the power-off period of the recording signal is short, and hence the sampling period is reduced. For this reason, in the present invention, when the recording speed is higher than the predetermined one, the sampling operation for wobble detection is performed during the recording period. By doing so, the level of the light receiving signal per se is large, and as a whole, a wobble signal can be detected at good C/N ratio independently of the recording speed.

In the optical disc recording method, the timing of the sampling/holding operation of the light receiving signal for detecting the wobble signal may adaptively be changed at the predetermined recording speed in accordance with a kind and a recording speed of the optical disc. If the timing of the sampling/holding operation is so changed, an optimum wobble signal C/N can be obtained at all times even if a kind and a recording speed of the optical disc are changed to other ones. As a result, the wobble servo is more stabilized.

The sampling pulse generating circuit of the optical disc recording apparatus according to the present invention preferably includes:

a first delay element which retards the first sampling pulse signal;

an inverter which inverts the first sampling pulse signal;

a second delay element which retards the first sampling pulse signal inverted by the inverter;

a switch which selects one of output signals of the first and second delay elements, and which outputs the second sampling pulse; and a switching control circuit which adaptively controls the switching operation of the switch based on at least the recording speed.

BRIEF DESCRIPTION OF THE DRAWINGS

The above and other objects and advantages of the present invention will become more apparent by describing in detail preferred embodiments thereof with reference to the accompanying drawings, wherein.

DETAILED DESCRIPTION OF THE PREFERRED EMBODIMENT

An optical disc recording method and apparatus according to the present invention will be described hereinbelow with reference to FIGS. 1 to 4.

Figure 1:
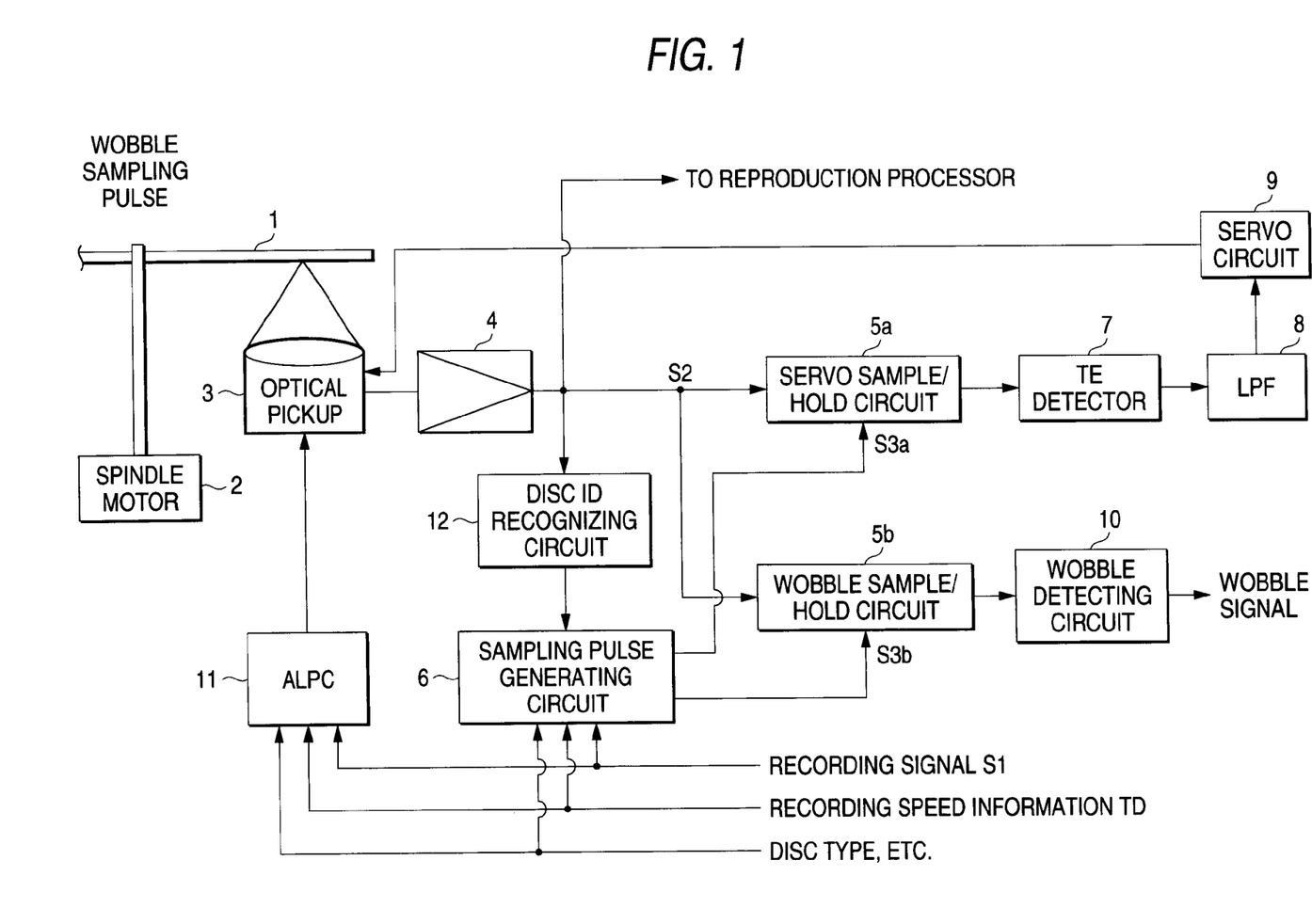
FIG. 1 is a block diagram showing a partial, basic construction of an optical disc recording apparatus according to the present invention.

In FIG. 1, an optical disc 1 is an optical disc of the CD-R type in which a dye layer is layered on a transparent substrate made of polycarbonate. A plurality of lands and grooves are formed on and in the transparent substrate at spatial intervals of 1.6 µm pitch for example. The dye layer contains, for example, a cyanine dye, a phthalo dye, a diazo dye or the like. The optical disc 1 is driven to rotate at a constant linear velocity by a spindle motor 2. An optical pickup 3 is located at a position being confronted with a recording surface of the optical disc 1. The optical pickup 3 is driven to move in the radial direction of the optical disc 1 by a feeding motor (not shown).

The optical pickup 3 has a laser diode therein. A laser beam is emitted from the laser diode of the optical pickup 3 and irradiated onto a recording surface of the land of the optical disc 1. Light, which is reflected from the optical disc 1, is received by a four-segment photo detector of the optical pickup 3, and then it is output in a form of a light receiving signal S2 from the optical pickup 3. The light receiving signal S2 is then amplified by an HF amplifier 4, and the amplified signal S2 is applied to a servo sample/hold circuit 5a and a wobble sample/hold circuit 5b. The servo sample/hold circuit 5a samples and holds the light receiving signal S2 for predetermined periods in accordance with a sampling pulse signal S3a output from a sampling pulse generating circuit 6. The wobble sample/hold circuit 5b samples and holds the light receiving signal S2 for predetermined periods in accordance with a sampling pulse signal S3b, which is adaptively switched in accordance with a recording speed and output from the sampling pulse generating circuit 6. The output signal of the servo sample/hold circuit 5a is detected as a TE signal by a TE detector portion 7, and then it is filteringly-processed by a low pass filter 8 and then is applied to a servo circuit 9. The servo circuit 9 performs a tracking control of the optical pickup 3 in accordance with the TE signal received. The output signal of the wobble sample/hold circuit 5b is supplied to a wobble detecting circuit 10 which detects a wobble signal. The detected wobble signal is processed by a signal processing system (not shown), whereby necessary ATIP information is obtained.

A recording signal S1 and recording speed information TD, which are output from a record signal generator circuit (not shown), are supplied to an automatic laser power control (ALPC) circuit 11. The ALPC circuit 11 controls laser power, which is used for recording the recording signal S1, in accordance with those pieces of information. In this embodiment, in order to optimize timings (time positions) of generating the sampling pulse signals S3a and S3b and the pulse widths of those pulse signals in accordance with a type of the optical disc 1, and in order to select the sampling pulse signal S3b, a disc ID recognizing circuit 12 recognizes, from a disc ID, a number of times of the recording speed, a kind of material and the like of the optical disc 1. And the time positions and pulse widths of the sampling pulse signals S3a and S3b are determined based on the recognition results, and the selection of the sampling pulse signal S3b is carried out based on the same. Information containing the disc kinds, recording speeds and the like, which is received from external, is also used for controlling the generation positions and the pulse widths of the sampling pulses, the laser power, etc.

Figure 2:
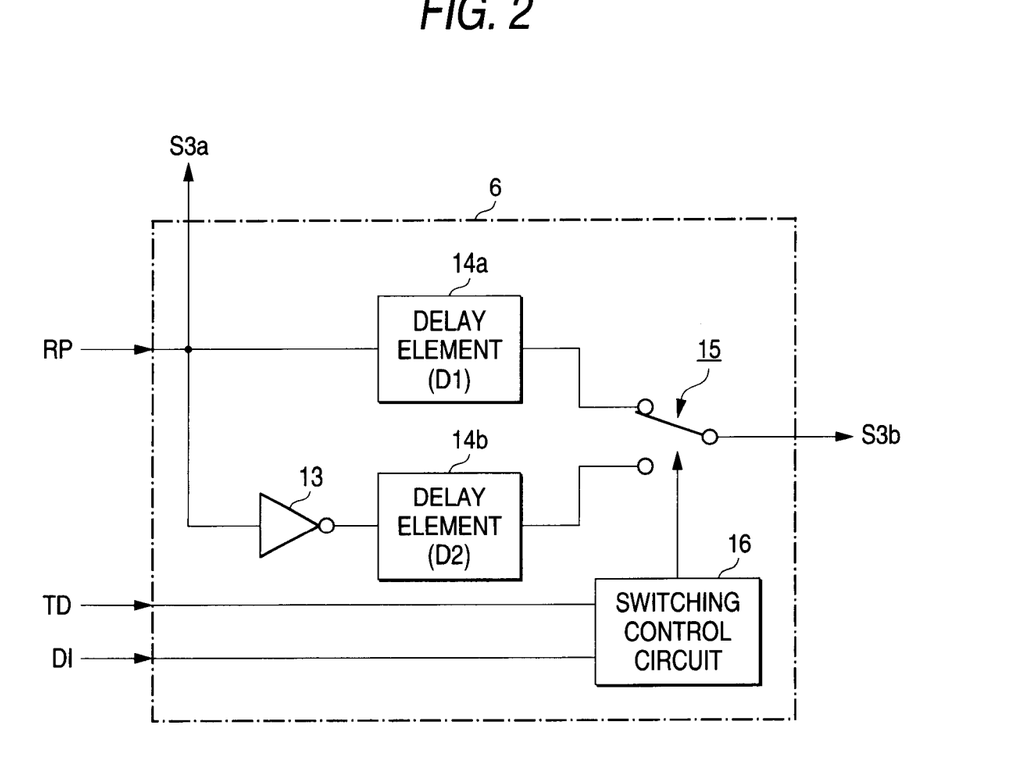
FIG. 2 is a block diagram showing a part of a sampling pulse generating circuit in the optical disc recording apparatus of FIG. 1.

In FIG. 2, a sampling pulse signal RP serving as an inverted recording signal S1, recording speed information TD, disc ID information DI and the like are input to the sampling pulse generating circuit 6. The sampling pulse signal RP is applied as a first sampling pulse signal S3a to the servo sample/hold circuit 5a. The signal RP is also input to a delay element 14a directly. Further, the signal RP is input to another delay element 14b via an inverter 13 by which the signal RP is inverted. Those delay elements 14a, 14b retard the respective sampling pulse signals RP by given time delays. Those sampling pulse signals RP, which have been delayed by and output from the delay elements 14a and 14b, are output to a switch 15. The recording speed information TD and the disc ID information DI are input to a switching control circuit 16 for controlling the switching operation of the switch 15. Based on those pieces of information, the switching control circuit 16 adaptively controls the switching operation of the switch 15 in the following way. When the recording speed is, for example, four times as high as the standard speed, the switching control circuit 16 controls the switching operation so as to select the output signal of the delay element 14a. When the recording speed is, for example, ten times or more relative to the standard speed, the switching control circuit 16 controls the operation of the switch 15 so as to select the output signal of the delay element 14b. The sampling pulse generating circuit 6 outputs the thus selected sampling pulse signal S3b to the wobble sample/hold circuit 5b.

Figure 3A:
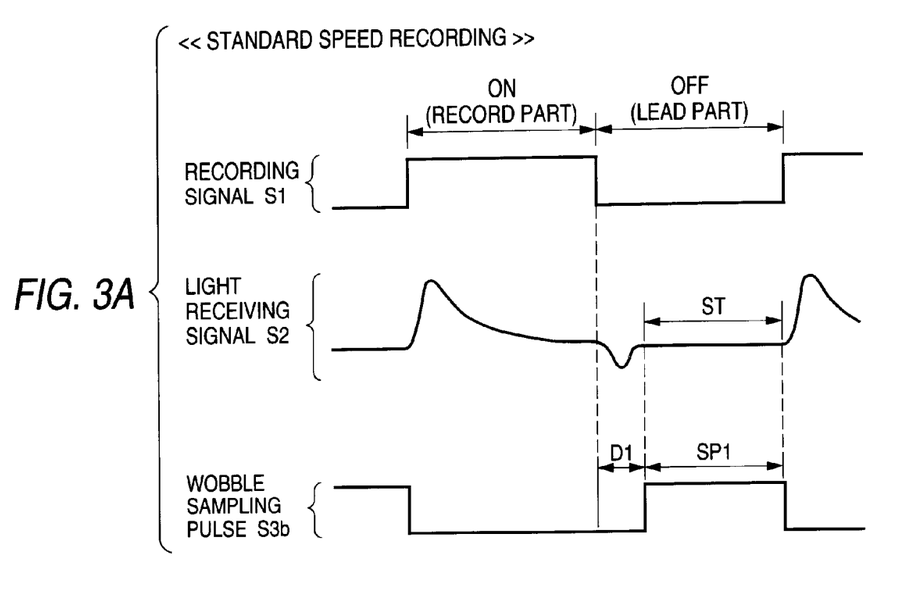
FIGS. 3A and 3B show two examples of waveforms, each illustrating a recording signal, a light receiving signal and a sampling signal for wobble detection in the optical disc recording apparatus of FIG. 1.
Figure 3B:
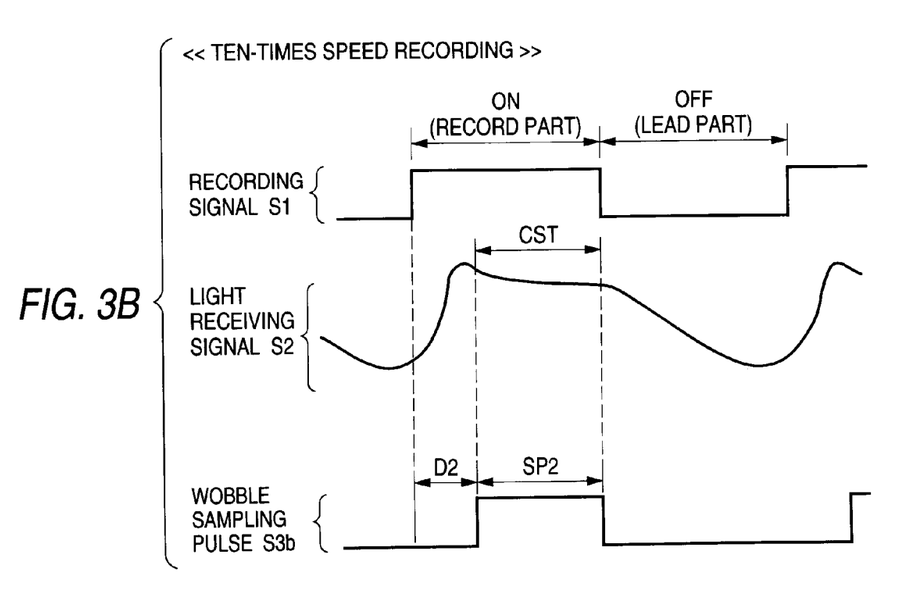

FIGS. 3A and 3B show two examples of waveforms, each illustrating a recording signal, a light receiving signal and a sampling signal for wobble detection when the optical disc 1 is placed in a recording mode. FIG. 3A shows those waveforms when the optical disc is rotated at the standard speed (i.e., the speed equal to the standard speed of an audio CD). FIG. 3B shows those waveforms when the optical disc is rotated at the recording speed ten times as high as the standard speed. In FIGS. 3A and 3B, a trailing edge of the sampling pulse S3b is coincident with a leading edge (see FIG. 3A) or a trailing edge (see FIG. 3B) of the recording signal in the power-on state. Incidentally, while such a sampling pulse signal S3b may be generated using an AND gate by logically summing the input signals from the delay elements 14a and 14b, such the AND gate is omitted to show in FIG. 2.

In the case of the standard speed recording shown in FIG. 3A, the light receiving signal S2 is long and stable during the power-off period (lead part) of the recording signal S1. Accordingly, the light receiving signal S2 during this period of time is sampled. For this reason, the switch 15 of the sampling pulse generating circuit 6 is operated to select the output signal of the delay element 14a. The sampling pulse generating circuit 6 retards a signal as the inverted recording signal S1 by a fixed delay time D1 by use of the delay element 14a, thereby generating a wobble sampling pulse signal S3b. Then, the sampling pulse generating circuit 6 outputs the generated sampling pulse signal S3b to the wobble sample/hold circuit 5b. In this way, the light receiving signal S2 may be sampled over a period (sampling period) ranging from the leading edge to the trailing edge of the wobble sampling pulse signal S3b, the period corresponding to a stable period ST where the light receiving signal S2 is stable.

As shown in FIG. 3B, in the recording operation at high recording speeds, the light receiving signal S2 is more stable during the power-on period (recording part) of the recording signal S1 than during the power-off period (lead part). Accordingly, the light receiving signal S2 is sampled over the power-on period. Accordingly, the switch 15 in the sampling pulse generating circuit 6 is operated so as to select the output signal of the delay element 14b. Also in the sampling pulse generating circuit 6, the signal serving as the inverted recording signal S1 is further inverted by the inverter 13 and applied to the delay element 14b where it is delayed by a fixed delay time D2, whereby a sampling pulse signal S3b is generated. The generated sampling pulse signal is then applied to the wobble sample/hold circuit 5b. Accordingly, a sampling period SP2 ranging from the leading edge to the trailing edge of the wobble sampling pulse signal S3b is set within the power-on period (record part) of the recording signal S1. Within the set period, a period CST, in which the light receiving signal S2 is relatively flat in waveshape after the period following the peak value of the light receiving signal S2, is used as a sampling period SP2, thereby being able to set the sampling period longer. As a result, the C/N ratio of the wobble signal is good.

Figure 4:
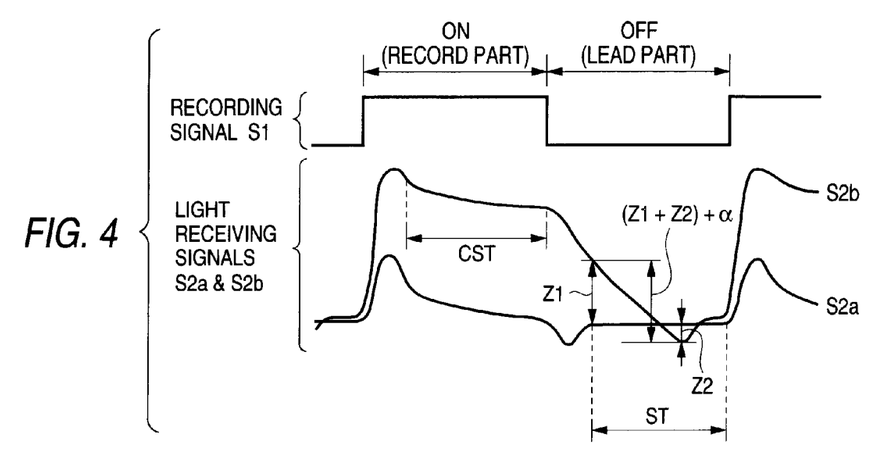
FIG. 4 is a waveform diagram showing a relationship between light receiving signals when the recording speed is four times and twelve times higher relative to the standard speed.

In order to further explain the operation in more detail, a light receiving signal at the recording speed of four times relative to the standard speed and a light receiving signal at the recording speed of twelve times relative to the standard speed are plotted on the same time axis in FIG. 4.

As shown in FIG. 4, a light receiving signal S2a in the recording speed of four times relative to the standard speed has a stable time duration ST within the power-off period of the recording signal S1. If this stable period is used for the sampling of the light receiving signal, the C/N ratio of the wobble signal is good. During this period, however, the light receiving signal S2b at the recording speed of twelve times relative to the standard speed varies greatly. If the sampling is performed during this period, the C/N ratio is degraded, and the spindle servo and the like will be greatly adversely affected accordingly. In this connection, during a stable period ST of the light receiving signal, a level difference between the light receiving signals S2a and S2b will be (Z1+Z2)+$\alpha$ if simply calculated. In the expression, Z1 is a signal level difference of the light receiving signal S2a from the light receiving signal S2b as measured in the plus direction, and Z2 is a signal level difference of the former from the latter as measured in the minus direction. From this expression, it is considered that this period is not preferable for the sampling period. To avoid the undesired level difference, in this embodiment, a period of the light receiving signal S2b corresponding to the stable period ST of the light receiving signal S2a where it is stable is not used for the sampling period intentionally. A period CST where those signals are relatively flat in waveshape within the power-on period (record part) of the recording signal S1 is used for the sampling period, instead. By doing so, the degradation of the C/N ratio of the wobble signal can be minimized even at the high recording speed.

It should be understood that the present invention is not limited to the above-mentioned embodiment, but may variously be modified, altered and changed within the true spirits of the present invention. For example, it is preferable that the delay time width D2 before the sampling starts during the power-on period of the recording signal is set not so long, with the intention of utilizing a return light part before some actual change occurs in the recording medium by light irradiation. To more increase the recording speed, the delay time width D2 may be reduced to a value near zero, if required.

As described above, in the present invention, the wobble sampling pulse signal is selected in accordance with the recording speed of the optical disc. Accordingly, there is no chance that the operation of detecting the wobble signal is adversely affected even at the high recording speed of the optical disc. As a result, the wobble servo and the like are stabilized in operation.

What is claimed is:

1. An optical disc recording method, comprising the steps of:
   irradiating an optical beam for information recording onto an optical disc, based on a recording signal;
   forming at least one pit having predetermined length on a land disposed on the optical disc;
   obtaining a light receiving signal by causing a light receiving element, having a light receiving surface segmented in a radial direction of the optical disc, to receive light reflected from a pit forming part and a non-pit forming part, both of which are formed on the optical disc at a time of information recording;
   sampling and holding the light receiving signal derived from the light receiving element; and
   performing a tracking servo operation and detecting a wobble signal on the basis of balance of the sampled and held light receiving signal as viewed in the radial direction of the optical disc;
   wherein when a recording speed is lower than a predetermined recording speed, the sampling and holding step is performed to detect the wobble signal during a power-off period of the recording signal, and
   wherein when the recording speed is higher than the predetermined recording speed, the sampling and holding step is performed during a power-on period of the recording signal.

2. The optical disc recording method of claim 1, further comprising the step of causing timing of the sampling and holding step for detecting the wobble signal to adaptively change at the predetermined recording speed in accordance with a kind and a recording speed of the optical disc.

3. An optical disc recording apparatus, comprising:
   an optical pickup emitting an optical beam to record a pit onto a land of an optical disc, based on a recording signal, the optical pickup including a light receiving element which has a light receiving surface segmented in a radial direction of the optical disc, and which receives light reflected from the optical disc, the optical pickup producing a light receiving signal associated with each segmental area of the light receiving surface;
   a sampling pulse generating circuit processing the recording signal to generate a first sampling pulse signal, the sampling pulse generating circuit retarding the recording signal to generate a second sampling pulse signal which is put in an on-state of the recording signal when a recording speed is lower than a predetermined speed, and which is put in an off-state of the recording signal when the recording speed is higher than the predetermined speed;
   a first sample/hold circuit which samples and holds the light receiving signal derived from the optical pickup based on the first sampling pulse signal;
   a tracking error detecting circuit which generates a tracking error signal based on balance of the light receiving signal sampled and held by the first sample/hold circuit as viewed in the radial direction of the optical disc;
   a servo circuit which performs a tracking control of the optical pickup on the basis of the tracking error signal from the tracking error detecting circuit;
   a second sample/hold circuit which samples and holds the light receiving signal output from the optical pickup based on the second sampling pulse signal; and a wobble detecting circuit which detects a wobble signal based on balance of the light receiving signal sampled and held by the second sample/hold circuit as viewed in the radial direction of the optical disc.

4. The optical disc recording apparatus of claim 3, wherein the sampling pulse generating circuit includes:

a first delay element which retards the first sampling pulse signal;

an inverter which inverts the first sampling pulse signal;

a second delay element which retards the first sampling pulse signal inverted by the inverter;

switch which selects one of output signals of the first and second delay elements, and which outputs the second sampling pulse signal; and a switching control circuit which adaptively controls the switching operation of the switch based on at least the recording speed.

* * * * *